United States Patent Office 3,803,222
Patented Apr. 9, 1974

3,803,222
OXO-TRIALKOXYPHENYL-ALKANOIC ACIDS
AND SALTS THEREOF
Aldo Garzia, Lodi, Italy, assignor to Istituto
Chemioterapico Italiano S.p.A., Milan, Italy
No Drawing. Filed June 26, 1970, Ser. No. 50,325
Int. Cl. C07c 65/20
U.S. Cl. 260—521 R                5 Claims

ABSTRACT OF THE DISCLOSURE 3,4,5-trialkoxybenzoylalkanoic acids and their pharmaceutically-acceptable salts for prophylaxis and treatment of cardiac disorders.

BACKGROUND OF THE INVENTION

This invention relates to a method of prophylaxis and treatment of cardiac disorders. In a particular aspect, it relates to a method of treating ischemic cardiopathy prior to or following a cardiac infarction, disorders of rhythm, and disorders of stimulus transmission by the administration of an alkanoic acid derivative.

The prevention and treatment of cardiac disorders, such as ischemia, thrombosis, cardiac infarction and disorders of rhythm and stimulus transmission, is a serious problem. Many studies have been conducted in an effort to ascertain the underlying causes and to develop a suitable method of preventing or treating these serious problems, particularly cardiac insufficiency and cardiac infarction. The pharmacological methods which have been proposed for preventing cardiac infarction include lowering of blood cholesterol levels, relaxation of the arteries and administration of anticoagulants. Ventricular fibrillation is a highly dangerous condition which is treated by electric shock administered to the heart muscle, and other rhythm and transmission disorders respond to installation of the "pacemaker" device.

While the use of these methods has greatly improved the prognosis of cardiac patients, the problem of cardiac disorders generally still remains a severe one and in particular the problems caused by infarction are still grave.

SUMMARY OF THE INVENTION

It is an object of this invention to provide a method of prophylaxis and treatment of cardiac disorders.

It is another object of this invention to provide novel pharmaceutical compositions suitable for the prophylaxis and treatment of cardiac disorders.

Another object of this invention is to provide a method of prophylaxis and prevention of ischemic cardiopathy, cardiac infarction and disorders of rhythm and stimulus transmission by the administration of derivatives of benzoylalkanoic acids.

Other objects of this invention will be readily apparent to those skilled in the art from the disclosure herein.

It has been discovered that administration of compounds corresponding to the following formula

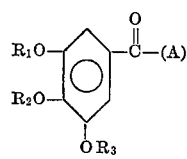

where each of $R_1$, $R_2$ and $R_3$ is methyl, ethyl or propyl and A is a saturated aliphatic hydrocarbon radical containing 3-8 carbon atoms substituted with one carboxylic acid group, or their pharmaceutically-acceptable salts, is effective in the prophylaxis and treatment of cardiac disorders such as cardiac ischemia and infarction, disorders of rhythm and disorders of stimulus transmission. The compound is administered at a dosage of 2-8 g. per day per average 60-70 kg. individual. When administration is by intravenous or intraperitoneal injection, soluble, pharmaceutically acceptable salts of the compounds of this invention are preferred.

DETAILED DISCUSSION

The compounds of the present invention are prepared generally by the method described in an article appearing in The Journal of the American Chemical Society, volume LXXV, January–March 1953, by John Koo, at pages 720–723.

The article specifically describes the preparation of γ-(3,4,5-trimethoxybenzoyl)-butyric acid by the reaction of ethyl 3,4,5-trimethoxybenzoylacetate with methyl β-bromopropionate in the presence of sodium in absolute ethanol at low temperature, i.e. 0° C., followed by hydrolysis of the crude ester with sulfuric acid.

According to the method of the present invention, compounds corresponding to the formula given hereinbefore are administered for the treatment of cardiac ischemia, either prior to or following a cardiac infarction, disorders of the rhythm whether related to the infarction or not, and disorders of stimulus transmission. Administration of these compounds is an effective prophylaxis in cases of an impending cardiac infarction and an effective treatment after infarction has occurred. According to one embodiment of the present invention, the method is employed in veterinary medicine, principally in the treatment of household pets, especially dogs, where cardiac problems are frequently encountered.

Cardiac infarction frequently occurs without prior symptoms or before the patient has sought treatment for the relief of symptoms. However physicians are frequently able to detect symptoms of an approaching crisis and the administration of the compounds of this invention can be started promptly to obtain prophylactic effects.

The products of the present invention are of a low-order of toxicity and no side effects are observed in clinical trials. Pharmacological studies indicate that the principal effect of the compounds of the invention is on the heart. The only observed effect on the circulatory system is an increase in the static blood pressure with no significant change in mean arterial pressure.

The dosage in which the compounds of the present invention can be given can vary widely within rather broad limits. Good results have been obtained with as little as 25 mg./kg./day and as much as 500 mg./kg./day. In human clinical cases, all of the disorders cited above generally respond to a dosage of 2-8 grams per day per person, preferably about 6 grams per day. This dosage is intended for an average 60-70 kg. individual equivalent to a dosage generally within the range of about 25-200 mg./kg./day. A dosage in the range of about 40-100 mg./kg./day is preferred. The treatment can consist of a single daily dose, or the above dosages can be given fractionally at periodic intervals. A single daily dose is generally preferred for a treatment of cardiac infarction and associated disorders but for prophylaxis, smaller periodic doses, e.g. a 500 mg. dose, 6 times daily, is preferred.

Administration of the compounds of this invention can be oral, subcutaneous, intravenous or intraperitoneal. When the compounds of the present invention are by subcutaneous, intraperitoneal or intravenous injection, they are administered as their water-soluble neutral salts. Any soluble, pharmaceutically-acceptable salt is suitable and the sodium and potassium salts are preferred. The sodium salt is particularly preferred. For oral administration the compounds are preferably administered as the free acids but they can also be pharmaceutically-acceptable salts, e.g. as the ammonium, sodium, potassium, magnesium or calcium salt. According to one suitable method, the free acids can be administered mixed with a molar equivalent of sodium or potassium bicarbonate. In the examples, the compounds were administered intraperitoneally as the sodium salt because of its ease of handling as an aqueous solution, but the weights given are for the free acid. When administered orally, the compounds are conveniently administered as tablets containing 500 mg. with a suitable binder, many of which are known.

Suitable tablets for human or animal use can conveniently be prepared containing 50–500 mg. of the compounds of the present invention, either as the free acid or as a pharmaceutically-acceptable salt thereof. Tablets containing as little as 50 mg. are suitable for oral administration, especially for infants and small children, and in veterinary medicine, for small animals. Tablets containing less than 50 mg. can be prepared, and in special cases may be useful, but generally a dose smaller than 50 mg. is too small to be practical because in the average patient the number of tablets required per day would be excessively high for convenience. Tablets containing more than 500 mg. can also be prepared, but large tablets are difficult for most patients to swallow.

EXAMPLE 1

In the following example, the experimental procedure described at page 722 of the article in Journal of the American Chemical Society, volume LXXV, January–March 1953, was duplicated.

To a solution of 3.5 g. of sodium in 250 ml. of absolute ethanol was added, at 40°, 28.2 g. of ethyl 3,4,5-trimethoxybenzoylacetate. The mixture was stirred for 10 minutes, then maintained below 0° during the dropwise addition with continued stirring of 2.17 g. of methyl β-bromopropionate. An interval of an hour was allowed to elapse between the addition of the first 0.17 g. portion of the bromo ester and of the remainder. The suspension was stirred for an additional 3 to 4 hours at 5–10°, allowed to stand at 10° overnight, diluted with ice-water and acidified with dilute hydrochloric acid. Extraction with ether followed by washing, drying and evaporating yielded 40 g. of a pale yellow oil, which was too unstable for purification.

The crude ester was refluxed with 250 ml. of 20% sulfuric acid for 45 hours. The mixture was chilled and the partly gummy crude acid treated with 200 ml. of 5% sodium hydroxide. Neutral material was removed by filtration and the filtrate acidified to yield 23 g. (81%) of almost colorless crystalline material. Recrystallization from water gave colorless plates, M.P. 118–120° (reported 120–121°).

The product is γ-(3,4,5-trimethoxybenzoyl)-butyric acid having the structure

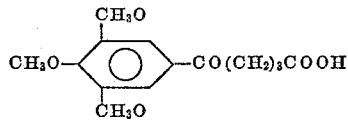

EXAMPLE 2

The effect of the compound prepared according to the procedure of Example 1 on the heart is determined in rats by intravenous injection of 1 unit per kilogram of vasopressin (Pitressin, marketed by Parke, Davis Co.), an antidiuretic pituitary hormone. As is known, the administration of vasopressin results in variations of the voltage and the morphology, or shape, of the T-wave. It also causes arrhythmia and produces ischemia of the myocardium. It is determined that these electrocardiographic alterations normally produced by the administration of Pitressin are prevented by the administration of the compound of Example 1.

EXAMPLE 3

The effects of the compound of Example 1 is determined on chloroform-epinephrine induced arrhythmias in rats. In the procedure employed, the rats are anaesthetized with urethane. Chloroform is administered for one minute by inhalation and then 10 micrograms/kg. of epinephrine hydrochloride is administered intravenously. Electrocardiograms are taken and the extent of the arrhythmia in terms of number of beats per minute is determined. The effect of the compound of Example 1 is substantially to reduce the extent of the arrhythmia when administered intraperitoneally in the amount of 700 mg./kg.

EXAMPLE 4

β-(3,4,5-triethoxybenzoyl)-α-isopropyl propionic acid is prepared in accordance with the procedure of Example 1 except that ethyl 3,4,5-triethoxybenzoylacetate and methyl-α-bromo isovalerate are employed.

EXAMPLE 5

β-(3,5-dimethoxy-4-ethoxybenzoyl)-α-isopentyl propionic acid is prepared in accordance with the procedure of Example 1 except that ethyl 3,5-dimethoxy-4-ethoxybenzoyl acetate and methyl-α-bromo isoenanthate are employed.

EXAMPLE 6

E-(3,4,5-trimethoxybenzoyl)-α-isopropyl caproic acid is prepared in accordance with the procedure of Example 1 except that methyl-δ-bromo-α-isopropyl valerate is employed.

EXAMPLE 7

A pharmaceutical composition in tablet form was prepared by mixing 500 mg. of the compound of Example 1 with 50 mg. of corn starch and 50 mg. of sucrose. This mixture was compressed in a tableting machine to make a durable tablet. It is suitable for oral administration to humans or other animals suffering from cardiac disorders. It is particularly suitable for prophylaxis of a suspected impending occlusion resulting in an infraction.

The above examples are representative. For example, the 3,4,5-trialkoxybenzoic acids are well known to the art. See, for example, U.S. Pats. 3,234,276; 3,364,249 and 3,485,865.

Caproic acid is available in commercial quantity and the commercial grade materials are suitable for preparing the products of this invention. The corresponding valeric, butyric, heptanoic, octanoic and nonanoic acids together with their isomers are prepared by known methods.

The recommended dosage during the first 24 hours following infarction is as follows:

2–4 grams by phleboclysis; 1–2 ampoules (each ampoule containing 2,000 mg. of the sodium salt of the compound of Example 1 dissolved in sufficient sterilized distilled water to make 10 cc.) dissolved in 400–600 cc. of saline solution.

2–4 grams by intravenous administration; 2–4 ampoules divided into 2–4 administrations (each ampoule containing 1,000 mg. of the sodium salt of the compound of Example 1 dissolved in sufficient sterilized distilled water to make 10 cc.).

2 grams by intramuscular administration; 8 ampoules divided into 4 administrations (each ampoule containing 250 mg. of the sodium salt of the compound of Example 1 and sufficient sterilized distilled water to make 3 cc.).

4–6 grams by oral administration; 8–12 tablets (each tablet containing 500 mg. of the sodium salt of the compound of Example 1 and sufficient excipient to make one tablet).

4–6 grams by oral administration; 8–12 ampoules (each ampoule containing one or two grams of the sodium salt of the compound of Example 1 in sufficient sterilized distilled water to make 10 cc.

In the third or fourth day after start of therapy, the dosage can be reduced to half the above amounts. The therapy should not be interrupted before the third week after heart infarction has occurred.

Both in the attack phrase and in the maintenance stage the therapy can be carried out using one or more of the different forms of administration.

I claim:
1. A compound represented by the formula

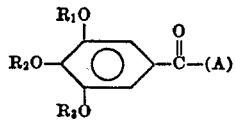

wherein each of $R_1$, $R_2$ and $R_3$ is methyl, ethyl or propyl and A is a saturated aliphatic hydrocarbon radical containing 4–8 carbon atoms substituted with one carboxylic acid group and pharmaceutically-acceptable salts thereof.

2. A compound represented by the formula

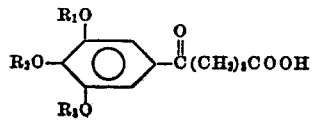

wherein each of $R_1$, $R_2$ and $R_3$ is methyl, ethyl or propyl, provided that at least one of $R_1$, $R_2$ and $R_3$ is other than methyl, and pharmaceutically-acceptable salts thereof.

3. The compound of claim 1 wherein $R_1$, $R_2$ and $R_3$ are ethyl and A is α-isopropyl propionic acid.

4. The compound of claim 1 wherein $R_1$ and $R_3$ are methyl, $R_2$ is ethyl, and A is α-isopentyl propionic acid.

5. The compound of claim 1 wherein $R_1$, $R_2$ and $R_3$ are methyl and A is α-isopropyl caproic acid.

References Cited
UNITED STATES PATENTS
2,580,459   1/1952   Papa et al. _____ 260—473 R

OTHER REFERENCES

Horning et al.: Chem. Abst. 45, 2959c.
Haworth et al.: ibid 43, 3403.
Iloo: J. Am. Chem. Soc. 75, 720 (1963).
Merck & Co. Inc., "The Merck Index" (1960), pp. 277–278, publ. by Merck & Co.

LORRAINE A. WEINBERGER, Primary Examiner

J. F. TERAPANE, Assistant Examiner

U.S. Cl. X.R.
424—317